UNITED STATES PATENT OFFICE.

CARL BOSCH, ALWIN MITTASCH, AND CHRISTOPH BECK, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF GERMANY.

MANUFACTURE OF OXIDS OF NITROGEN.

1,207,708.

Specification of Letters Patent. Patented Dec. 12, 1916.

No Drawing. Application filed February 25, 1915. Serial No. 10,628.

*To all whom it may concern:*

Be it known that we, CARL BOSCH, ALWIN MITTASCH, and CHRISTOPH BECK, citizens of the German Empire, residing at Ludwigshafen-on-the-Rhine, Germany, have invented new and useful Improvements in the Manufacture of Oxids of Nitrogen, of which the following is a specification.

We have found that the catalytic oxidation of ammonia with the formation of oxids of nitrogen is effected in a very advantageous manner by passing a mixture of ammonia and an oxygen containing gas, such as air, or oxygen over a hot catalytic agent containing both an oxid of a metal of the iron group and a compound of bismuth for example an oxid of bismuth. The catalyst may contain an oxid of a single metal of the iron group (in particular an oxid of iron, manganese, chromium or uranium), or oxids of two, or more, of such metals, and in addition to the aforesaid compounds, it may contain other substances, for instance, binding agents, but it is preferred to avoid the presence of certain non-metallic elements and metalloids and compounds thereof, such as phosphoric acid, boric acid and silica, or at any rate larger quantities thereof. The production of the catalytic mixtures can advantageously be carried out by precipitating, or calcining, mixtures of salts of the components and then forming the mass into suitably shaped pieces, or lumps, and we prefer to employ the said catalytic mixtures in a layer, or layers, of small lumps. The proportions of the ingredients can be varied considerably.

The following examples will serve to illustrate further the nature of our invention which, however, is not confined to these examples. The parts are by weight: Dissolve a mixture of 45 parts of pure ferric nitrate and from 1 to 2 parts of pure bismuth nitrate, if necessary, while adding some pure nitric acid; then precipitate with ammonia, filter, dry the precipitate somewhat, form it into small cubes, heat slowly, place the mass in a contact tube, or furnace, and then pass a mixture of ammonia and air through it. By employing a temperature of about 700° C. a yield of 90 per cent. or more can be easily and regularly obtained. In this example the ferric nitrate may, wholly or by parts, be replaced by salts of other metals of the iron group, for instance by manganese nitrate and further more binding agents, such as calcium oxid, magnesia or alumina can be added. A suitable contact mass can also be obtained by melting pure iron powder with say 3% of bismuth-oxid in the presence of oxygen and then breaking up the mass into small pieces. Further metallic iron itself can be mixed or coated with bismuth or with compounds thereof and then placed immediately in the contact furnace. Instead of adding the compound of bismuth to the catalytic mass before its use, it can be simply introduced mechanically into the mass already contained in the contact furnace, *e. g.*, by spreading it onto its surface or by blowing it into the mass with the aid of a current of gas.

Now what we claim is:—

1. The process of manufacturing oxids of nitrogen which consists in passing a mixture of ammonia and an oxygen-containing gas over a heated catalytic agent containing at least one oxid of a metal of the iron group and a compound of bismuth.

2. The process of manufacturing oxids of nitrogen which consists in passing a mixture of ammonia and an oxygen-containing gas over a heated catalytic agent containing at least one oxid of a metal of the iron group and an oxid of bismuth.

3. The process of manufacturing oxids of nitrogen which consists in passing a mixture of ammonia and an oxygen-containing gas through a layer of separate lumps of a heated catalytic agent containing at least one oxid of a metal of the iron group and a compound of bismuth.

4. The process of manufacturing oxids of nitrogen which consists in passing a mixture of ammonia and an oxygen-containing gas through a layer of separate lumps of a heated catalytic agent containing at least one oxid of a metal of the iron group and an oxid of bismuth.

In testimony whereof we have hereunto set our hands in the presence of two subscribing witnesses.

CARL BOSCH.
ALWIN MITTASCH.
CHRISTOPH BECK.

Witnesses:
ARTHUR DENONVILLE,
JOHANNES ACHMEL.